A. S. GIBB.
APPARATUS FOR DELIVERING WATER FOR IRRIGATION PURPOSES.
APPLICATION FILED APR. 8, 1913.

1,085,860.

Patented Feb. 3, 1914.

UNITED STATES PATENT OFFICE.

ANDREW SHIRRA GIBB, OF PUNJAB, INDIA.

APPARATUS FOR DELIVERING WATER FOR IRRIGATION PURPOSES.

1,085,860.

Specification of Letters Patent. Patented Feb. 3, 1914.

Application filed April 8, 1913. Serial No. 759,690.

*To all whom it may concern:*

Be it known that I, ANDREW SHIRRA GIBB, a subject of the King of the United Kingdom of Great Britain and Ireland, and residing at Punjab, India, have invented a certain new and useful Improvement in Apparatus for Delivering Water for Irrigation Purposes, of which the following is a specification.

This invention relates to improvements in self-regulating apparatus such as described in the specification of Letters Patent Nos. 859,935 and 1,012,072. In the specification of Letters Patent numbered 1,012,072 there is described a self-regulating apparatus in which the regulating chamber is of D-shaped formation divided into a number of compartments communicating with one another, in which the excess of water flowing through the chamber is drawn off and stored, thus insuring a practically constant discharge notwithstanding variations in head of the source of supply within limits determined largely by the dimensions of the apparatus.

The present invention consists primarily in the provision of a regulating chamber of substantially spiral formation in lieu of the D-shaped chamber aforesaid. With this construction it is possible greatly to increase the number of storage compartments, whereby the range of head of source of supply within which a constant supply can be delivered is greatly increased.

The invention is illustrated by way of example in the accompanying drawings in which—

Figure 1:
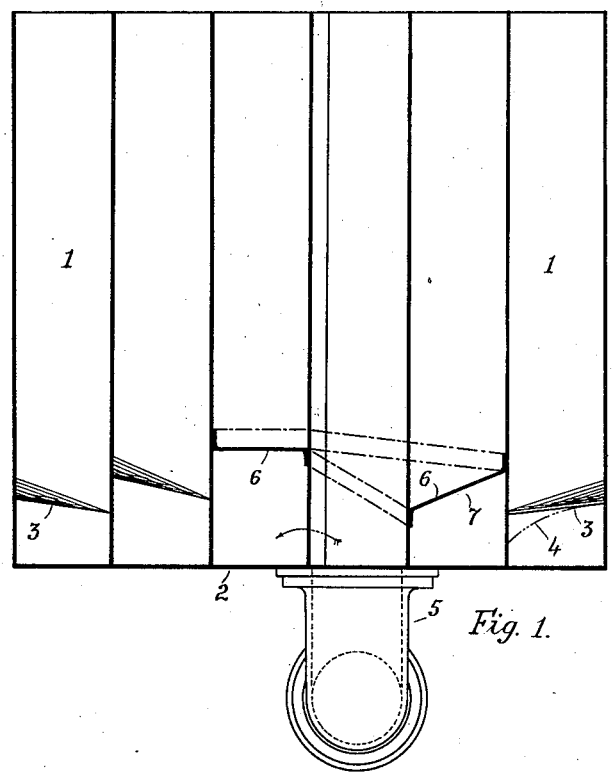
Figure 2:
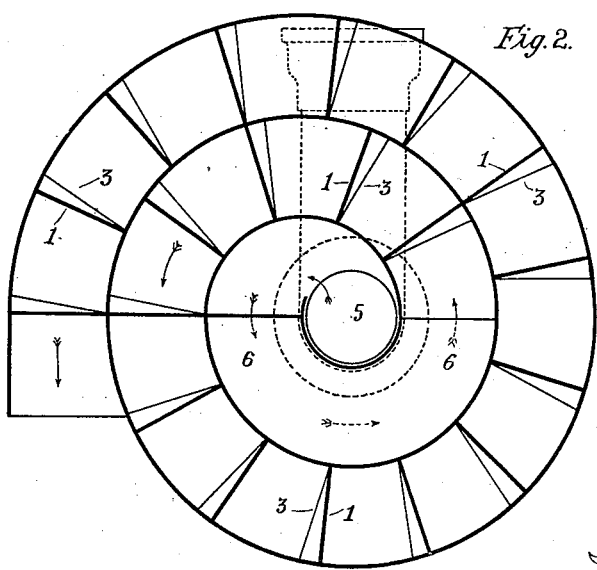

Figure 1 is a vertical section, and Fig. 2 is a horizontal section of the improved apparatus.

Referring to the drawings, a series of vertical partitions 1 are fitted substantially radially between the walls of a chamber and dividing it into compartments communicating with each other at their lower ends, said chamber being provided with a base 2 and being so formed as to constitute in conjunction with the lower edges 3 of the partitions 1 an extended passage of substantially spiral formation for the stream of water flowing from the distributing channel or the like to the watercourse or the like. If the head of water in said distributing channel increases, the vortex or rotational condition of flow, by virtue of which condition water rises toward its outer periphery, is interrupted in the surface layers of water by the lower edges 3 of the partitions 1 and the water, the flow of which is thus obstructed, flows down toward the center of the curve, and in so doing generates a circulating radial or cross-flow in the compartment between the partitions 1, which flow eliminates, retains or dissipates and renders ineffective for the purpose of delivering water, head or energy in the water which may be in excess of that required, and so insures a constant discharge. With respect to its function in rendering excess head ineffective for delivering water in the manner above described, each compartment formed within the spiral chamber by means of the partitions 1, is capable of acting as a separate unit; and, when the excess of head is so great that it cannot be disposed of in the upstream compartment, the remaining excess is dealt with in the succeeding compartments in the same manner until only the required head remains and the water then flows unobstructed under the edges 3 of the remaining partitions 1 and only the required discharge is delivered, notwithstanding the excess of head.

It will be understood that the range of head within which the regulating apparatus is effective is largely determined by the number and size of compartments. With a chamber of spiral formation the maximum number of compartments for effective working can be introduced without unduly increasing the size of the apparatus.

The lower edges 3 of the partitions 1 are preferably bent upwardly to point upstream and disposed approximately tangential to the section of the surface 4 of the stream, as shown in Fig. 1.

In order to establish a vortex or rotational condition of flow of the water before entering the regulating chamber, the water may be led to said chamber, as indicated by arrows in Fig. 2, from an inlet pipe 5 to an initial portion of the spirally-shaped passage, which portion is or may be provided with a roof or cover 6 which is gradually inclined downwardly until reaching the inlet proper to the regulating chamber when it assumes substantially the inclination shown at 7, Fig. 1. It will be understood that the initial spiral portion of the passage aforesaid may be omitted for the purpose above stated, the inlet pipe being formed in any suitable manner and being connected directly to the inlet of the regulating chamber.

Having now described my invention what I claim and desire to secure by Letters Patent of the United States is:—

1. Self-regulating apparatus for delivering a constant supply of water for irrigation or like purposes, comprising a chamber provided with an inlet and an outlet, and vertical partitions dividing the chamber into compartments, the lower edges of said partitions constituting in conjunction with the lower part of said chamber a passage of substantially spiral formation for the stream of water flowing through the chamber.

2. Self-regulating apparatus for delivering a constant supply of water for irrigation or like purposes, comprising a chamber provided with an inlet including a spiral portion and with an outlet, and vertical partitions dividing the chamber into compartments, the lower edges of said partitions constituting in conjunction with the lower part of said chamber a passage of substantially spiral formation for the stream of water flowing through the chamber.

3. Self-regulating apparatus for delivering a constant supply of water for irrigation or like purposes, comprising a chamber provided with an inlet including a roofed spiral portion and with an outlet, and vertical partitions dividing the chamber into compartments, the lower edges of said partitions constituting in conjunction with the lower part of said chamber a passage of substantially spiral formation for the stream of water flowing through the chamber.

4. Self-regulating apparatus for delivering a constant supply of water for irrigation or like purposes, comprising a chamber provided with an inlet and an outlet, and vertical partitions dividing the chamber into compartments, the lower edges of said partitions constituting in conjunction with the lower part of said chamber a passage of substantially spiral formation for the stream of water flowing through the chamber, and being disposed approximately tangential to the section of the surface of the stream.

5. Self-regulating apparatus for delivering a constant supply of water for irrigation or like purposes, comprising a chamber provided with an inlet including a spiral portion and with an outlet, and vertical partitions dividing the chamber into compartments, the lower edges of said partitions constituting in conjunction with the lower part of said chamber a passage of substantially spiral formation for the stream of water flowing through the chamber, and being disposed approximately tangential to the section of the surface of the stream.

6. Self-regulating apparatus for delivering a constant supply of water for irrigation or like purposes, comprising a chamber provided with an inlet including a roofed spiral portion and with an outlet, and vertical partitions dividing the chamber into compartments, the lower edges of said partitions constituting in conjunction with the lower part of said chamber a passage of substantially spiral formation for the stream of water flowing through the chamber, and being disposed approximately tangential to the section of the surface of the stream.

In testimony whereof I have signed my name to this specification in the presence of two subscribing witnesses.

ANDREW SHIRRA GIBB.

Witnesses:
JOHN MCCLEARY,
THOMAS BISHOP GRAHAM.

Copies of this patent may be obtained for five cents each, by addressing the "Commissioner of Patents, Washington, D. C."